United States Patent [19]
Anderson et al.

[11] Patent Number: 6,028,611
[45] Date of Patent: *Feb. 22, 2000

[54] MODULAR DIGITAL IMAGE PROCESSING VIA AN IMAGE PROCESSING CHAIN

[75] Inventors: Eric C. Anderson, San Jose; Gary Chin, Milpitas; George W. Dalke, Palo Alto, all of Calif.

[73] Assignee: Apple Computer, Inc., Cupertino, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/705,619

[22] Filed: Aug. 29, 1996

[51] Int. Cl.[7] ........................................... G06T 1/20
[52] U.S. Cl. ........................... 345/506; 348/222; 382/303
[58] Field of Search .................... 345/429–432, 345/501–506; 382/162, 166, 167, 232, 254, 256, 260, 266, 300, 302, 303, 307, 163, 276; 396/373; 348/207, 211, 213, 222, 223, 229, 231–234, 239, 241, 246, 247, 251, 252, 254

[56] References Cited

U.S. PATENT DOCUMENTS

| | | | |
|---|---|---|---|
| 4,442,543 | 4/1984 | Stemberg et al. | 382/257 |
| 4,794,524 | 12/1988 | Carberry et al. | 712/32 |
| 4,850,027 | 7/1989 | Kimmel | 382/303 |
| 4,860,375 | 8/1989 | McCubbrey et al. | 382/303 |
| 4,949,390 | 8/1990 | Iverson et al. | 382/258 |
| 5,237,626 | 8/1993 | Forslund et al. | 382/256 |
| 5,283,671 | 2/1994 | Stewart et al. | 358/532 |
| 5,315,700 | 5/1994 | Johnston et al. | 345/502 |
| 5,365,596 | 11/1994 | Dante et al. | 382/141 |
| 5,402,170 | 3/1995 | Parulski et al. | 348/211 |
| 5,452,375 | 9/1995 | Rousseau et al. | 382/302 |
| 5,477,264 | 12/1995 | Sarbadhikari et al. | 348/231 |
| 5,563,655 | 10/1996 | Lathrop | 348/231 |
| 5,568,192 | 10/1996 | Hannah | 348/222 |
| 5,606,365 | 2/1997 | Maurinus et al. | 348/222 |
| 5,623,604 | 4/1997 | Russell et al. | 395/712 |
| 5,631,974 | 5/1997 | Lau-Kee et al. | 382/302 |
| 5,642,444 | 6/1997 | Mostafavi | 382/303 |
| 5,661,823 | 8/1997 | Yamauchi et al. | 382/239 |
| 5,734,425 | 3/1998 | Takizawa et al. | 348/231 |
| 5,739,850 | 4/1998 | Hori | 348/231 |
| 5,764,817 | 6/1998 | Suzuki et al. | 382/302 |

*Primary Examiner*—Ulka J. Chauhan
*Attorney, Agent, or Firm*—Sawyer & Associates

[57] ABSTRACT

A method for manipulating image data in a digital image capture device includes forming two or more image processors, and providing the two or more image processors in the digital image capture device. The method further includes linking the two or more image processors to form an image processing chain, the image processing chain capable of manipulating image data in sequential and serial manners.

In a system aspect, the system includes a digital image capture device, the digital image capture device capable of processing digital image data through two or more image processors. The system further includes a central processing unit within the digital image capture device and capable of linking the two or more image processors to form an image processing chain, wherein the image processing chain manipulates the digital image data in sequential and serial manners.

19 Claims, 8 Drawing Sheets

MODULAR DIGITAL IMAGE PROCESSING VIA AN IMAGE PROCESSING CHAIN

RELATED APPLICATIONS

The present invention is related to co-pending U.S. patent application Ser. No. 08/705,588, filed on Aug. 29, 1996, entitled FLEXIBLE DIGITAL IMAGE PROCESSING VIA AN IMAGE PROCESSING CHAIN WITH MODULAR IMAGE PROCESSORS, and assigned to the assignee of the present invention.

The present invention is also related to co-pending U.S. patent application Ser. No. 08/705,325, filed on Aug. 29, 1996, entitled MODULAR DIGITAL IMAGE PROCESSING VIA AN IMAGE PROCESSING CHAIN WITH MODIFIABLE PARAMETER CONTROLS, and assigned to the assignee of the present invention.

FIELD OF THE INVENTION

The present invention relates to digital image data processing, and more particularly to modular digital image data processing.

BACKGROUND OF THE INVENTION

Modern digital cameras typically include an imaging device which is controlled by a computer system. The computer system accesses raw image data captured by the imaging device and then processes and compresses the data before storing the compressed data into an internal memory. The conventional digital camera captures raw image data and then remains unusable until the data is completely processed and stored into internal flash memory.

In processing image data, typical digital cameras operate with exclusive and specific image processing. Thus, all the potential manipulations on image data, such as linearization, sharpening, and compression, occur as a result of isolated preset programming and/or specifically designed hardware.

While some level of manipulation of image data is achieved with the programming or hardware, attempts to alter and improve the processing are hampered by the rigid structure of using a single file/specific components. Furthermore, camera functionality remains tied to technology available at the time of the design and is not readily replaced and updated as technology improves. Accordingly, a need exists for a more flexible, modular approach for processing digital image data that provides enhanced digital image output through an adaptable image processing system.

SUMMARY OF THE INVENTION

Accordingly, the present invention meets these needs and provides a method and system for manipulating image data in a digital image capture device. In a method aspect, the method includes forming two or more image processors, and providing the two or more image processors in the digital image capture device. The method further includes linking the two or more image processors to form an image processing chain, the image processing chain capable of manipulating image data in sequential and serial manners.

In a system aspect, the system includes a digital image capture device, the digital image capture device capable of processing digital image data through two or more image processors. The system further includes a central processing unit within the digital image capture device and capable of linking the two or more image processors to form an image processing chain, wherein the image processing chain manipulates the digital image data in sequential and serial manners.

With the present invention, processing of digital image data occurs with a linked series of image processors. Each of the image processors performs some level of manipulation of the digital image data. The separation of digital image processing into a series of image processors allows a more modular approach to processing digital image data. Further, the present invention uniquely allows modification of the series through deletion of an image processor, insertion of a different image processor, or replacement of an existing image processor. In addition, aspects of an image processor, including parameter control values, are alterable in accordance with a preferred embodiment to allow greater adaptability to user-specific design preferences. Enhancements and changes to the chain are therefore easily achieved, allowing greater flexibility and more convenient upgrading of digital image processing.

These and other advantages of the aspects of the present invention will be more fully understood in conjunction with the following detailed description and accompanying drawings.

DETAILED DESCRIPTION

The present invention relates to a flexible, modular approach to processing of digital image data. The following description is presented to enable one of ordinary skill in the art to make and use the invention and is provided in the context of a patent application and its requirements. Various modifications to the preferred embodiment and the generic principles and features described herein will be readily apparent to those skilled in the art.

Although the following describes processing of digital image data captured through a digital camera device, it is meant as an illustrative embodiment of the features of the present invention. The present invention is equally capable of utilization with other devices that perform digital image data capture and processing, including, but not limited to, computer systems, including those used to capture digital images accessible from Internet sites and image scanner equipment. Further, the data structures and commands discussed with reference to a preferred embodiment are suitably included as part of high level code used directly by one or more applications that is readily achieved through the use of C, C++, or other similar programming language, and stored on a computer readable medium.

A digital camera architecture has been disclosed in co-pending U.S. patent application Ser. No. 08/666,241, entitled "A System And Method For Using A Unified Memory Architecture To Implement A Digital Camera Device," filed on Jun. 20, 1996, and assigned to the Assignee of the present application. The Applicant hereby incorporates the co-pending application by reference, and reproduces portions of that application herein with reference to FIGS. 1–5 for convenience.

Figure 1:
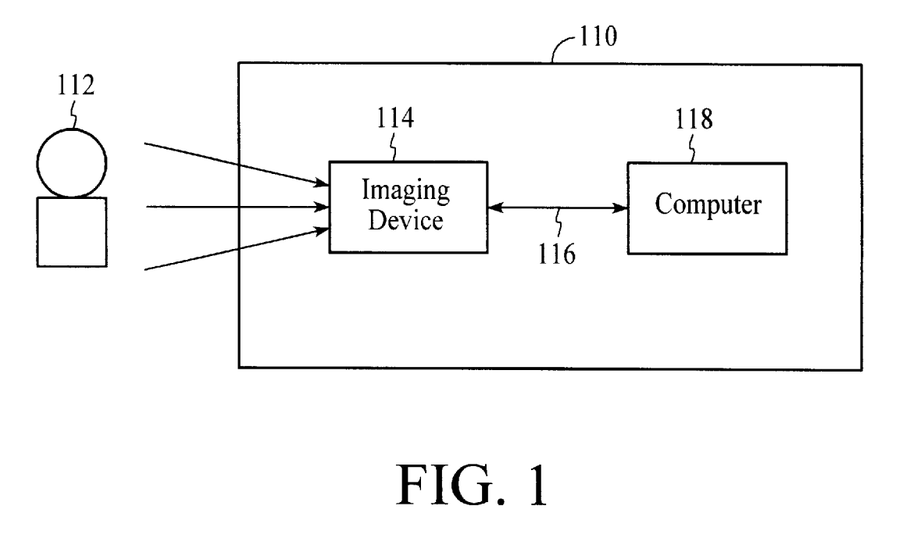
FIG. 1 is a block diagram of a digital camera that operates in accordance with the present invention.

Referring now to FIG. 1, a block diagram of a camera 110 is shown according to the present invention. Camera 110 preferably comprises an imaging device 114, a system bus 116 and a computer 118. Imaging device 114 is optically coupled to an object 112 and electrically coupled via system bus 116 to computer 118. Once a photographer has focused imaging device 114 on object 112 and, using a capture button or some other means, instructed camera 110 to capture an image of object 112, computer 118 commands imaging device 114 via system bus 116 to capture raw image data representing object 112. The captured raw image data is transferred over system bus 116 to computer 118 which performs various image processing functions on the image data before storing it in its internal memory. System bus 116 also passes various status and control signals between imaging device 114 and computer 118.

Figure 2:
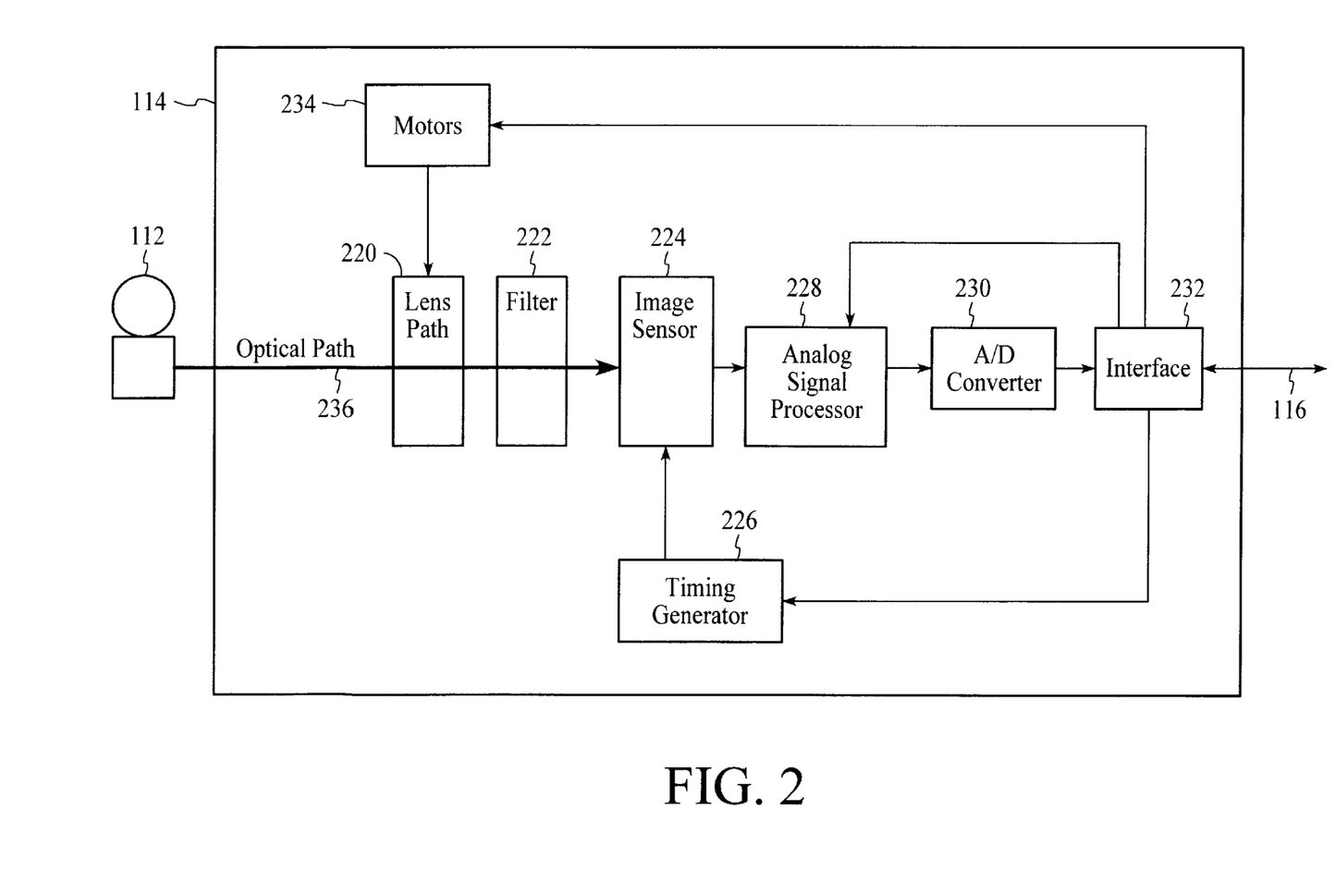
FIG. 2 is a block diagram of the preferred embodiment for the imaging device of FIG. 1.

Referring now to FIG. 2, a block diagram of the preferred embodiment of imaging device 114 is shown. Imaging device 114 preferably comprises a lens 220 having an iris, a filter 222, an image sensor 224, a timing generator 226, an analog signal processor (ASP) 228, an analog-to-digital (A/D) converter 230, an interface 232, and one or more motors 234.

U.S. patent application Ser. No. 08/355,031, entitled "A System and Method For Generating a Contrast Overlay as a Focus Assist for an Imaging Device," filed on Dec. 13, 1994, now U.S. Pat. No. 5,496,106, is incorporated herein by reference and provides a detailed discussion of the preferred elements of imaging device 114. Briefly, imaging device 114 captures an image of object 112 via reflected light impacting image sensor 224 along optical path 236. Image sensor 224 responsively generates a set of raw image data representing the captured image 112. The raw image data is then routed through ASP 228, A/D converter 230 and interface 232. Interface 232 has outputs for controlling ASP 228, motors 234 and timing generator 226. From interface 232, the raw image data passes over system bus 116 to computer 118.

Figure 3:
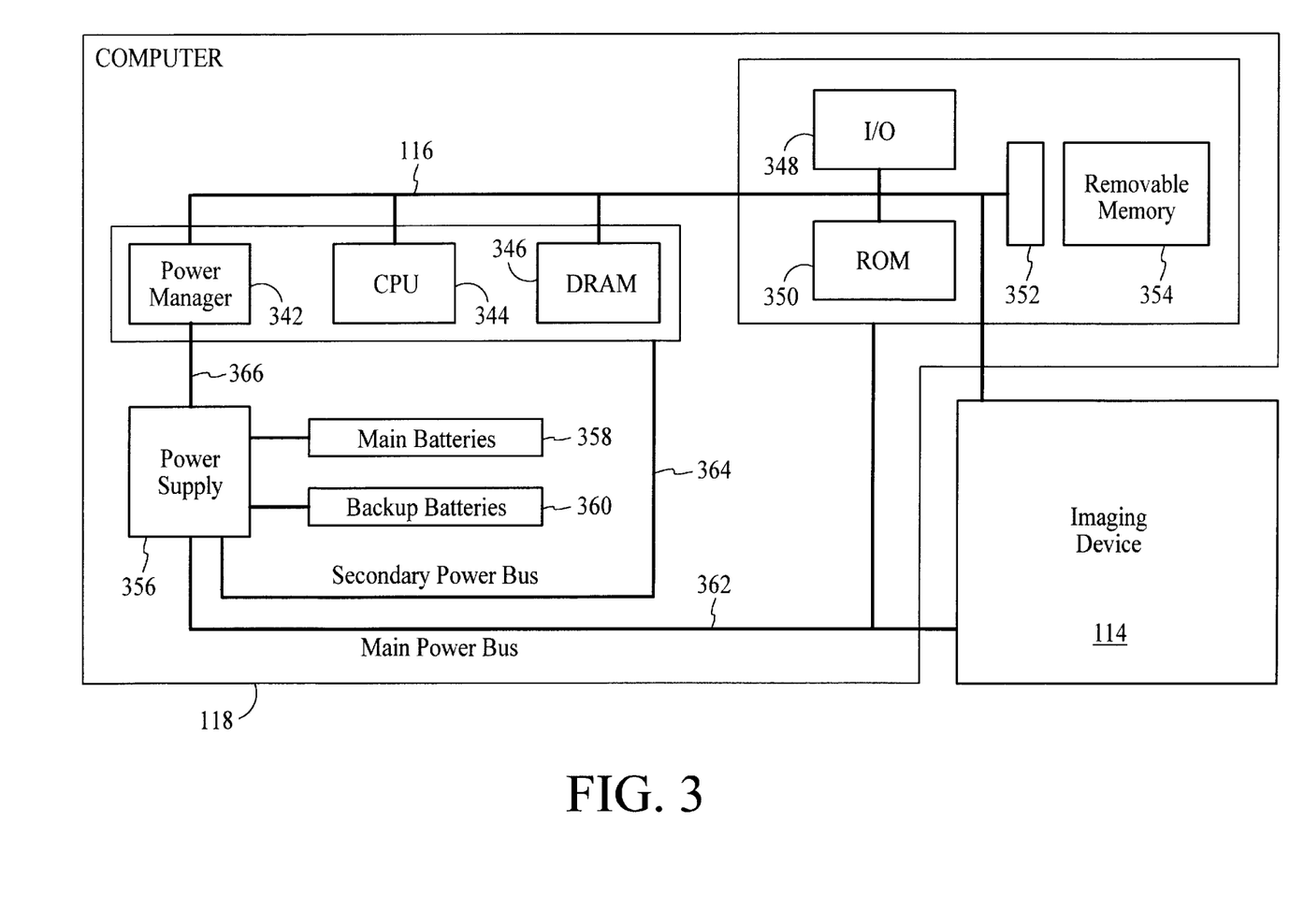
FIG. 3 is a block diagram of the preferred embodiment for the computer of FIG. 1.

Referring now to FIG. 3, a block diagram of the preferred embodiment for computer 118 is shown. System bus 116 provides connection paths between imaging device 114, power manager 342, central processing unit (CPU) 344, dynamic random-access memory (DRAM) 346, input/output interface (I/O) 348, read-only memory (ROM) 350, and buffers/connector 352. Removable memory 354 connects to system bus 116 via buffers/connector 352. Alternately, camera 110 may be implemented without removable memory 354 or buffers/connector 352.

Power manager 342 communicates via line 366 with power supply 356 and coordinates power management operations for camera 110. CPU 344 typically includes a conventional processor device for controlling the operation of camera 110. In the preferred embodiment, CPU 344 is capable of concurrently running multiple software routines to control the various processes of camera 110 within a multi-threading environment. DRAM 346 is a contiguous block of dynamic memory which may be selectively allocated to various storage functions.

I/O 348 is an interface device allowing communications to and from computer 118. For example, I/O 348 permits an external host computer (not shown) to connect to and communicate with computer 118. I/O 348 also permits a camera 110 user to communicate with camera 110 via an external user interface and via an external display panel, referred to as a view finder.

ROM 350 typically comprises a conventional nonvolatile read-only memory which stores a set of computer-readable program instructions to control the operation of camera 110. ROM 350 is further discussed below in conjunction with FIG. 4. Removable memory 354 serves as an additional image data storage area and is preferably a non-volatile device, readily removable and replaceable by a camera 110 user via buffers/connector 352. Thus, a user who possesses several removable memories 354 may replace a full removable memory 354 with an empty removable memory 354 to effectively expand the picture-taking capacity of camera 110. In the preferred embodiment of the present invention, removable memory 354 is typically implemented using a flash disk.

Power supply 356 supplies operating power to the various components of camera 110. In the preferred embodiment, power supply 356 provides operating power to a main power bus 362 and also to a secondary power bus 364. The main power bus 362 provides power to imaging device 114, I/O 348, ROM 350 and removable memory 354. The secondary power bus 364 provides power to power manager 342, CPU 344 and DRAM 346.

Power supply 356 is connected to main batteries 358 and also to backup batteries 360. In the preferred embodiment, a camera 110 user may also connect power supply 356 to an external power source. During normal operation of power supply 356, the main batteries 358 provide operating power to power supply 356 which then provides the operating power to camera 110 via both main power bus 362 and secondary power bus 364.

During a power failure mode in which the main batteries 358 have failed (when their output voltage has fallen below a minimum operational voltage level) the backup batteries 360 provide operating power to power supply 356 which then provides the operating power only to the secondary power bus 364 of camera 110. Selected components of camera 110 (including DRAM 346) are thus protected against a power failure in main batteries 358.

Power supply 356 preferably also includes a flywheel capacitor connected to the power line coming from the main batteries 358. If the main batteries 358 suddenly fail, the flywheel capacitor temporarily maintains the voltage from the main batteries 358 at a sufficient level, so that computer 118 can protect any image data currently being processed by camera 110 before shutdown occurs.

Figure 4:
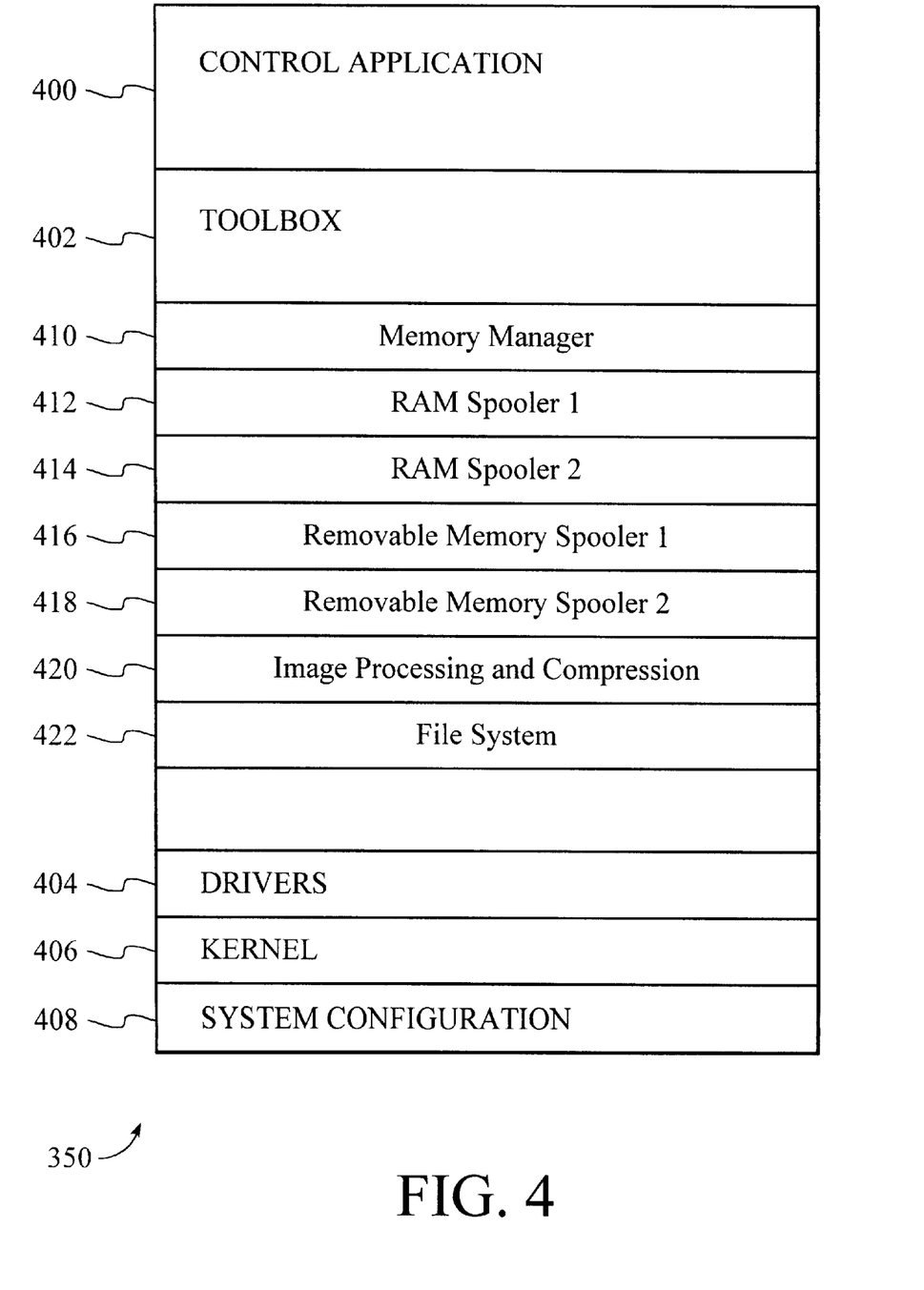
FIG. 4 is a memory map showing the preferred embodiment of the read only memory (ROM) of FIG. 3.

Referring now to FIG. 4, a memory map showing the preferred embodiment of ROM 350 is shown. In the preferred embodiment, ROM 350 includes control application 400, toolbox 402, drivers 404, kernal 406 and system configuration 408. Control application 400 comprises program instructions for controlling and coordinating the various functions of camera 110. Toolbox 402 contains selected function modules including memory manager 410, RAM spooler 1 (412), RAM spooler 2 (414), removable memory spooler 1 (416), removable memory spooler 2 (418), image processing and compression 420 and file system 422.

Figure 5:
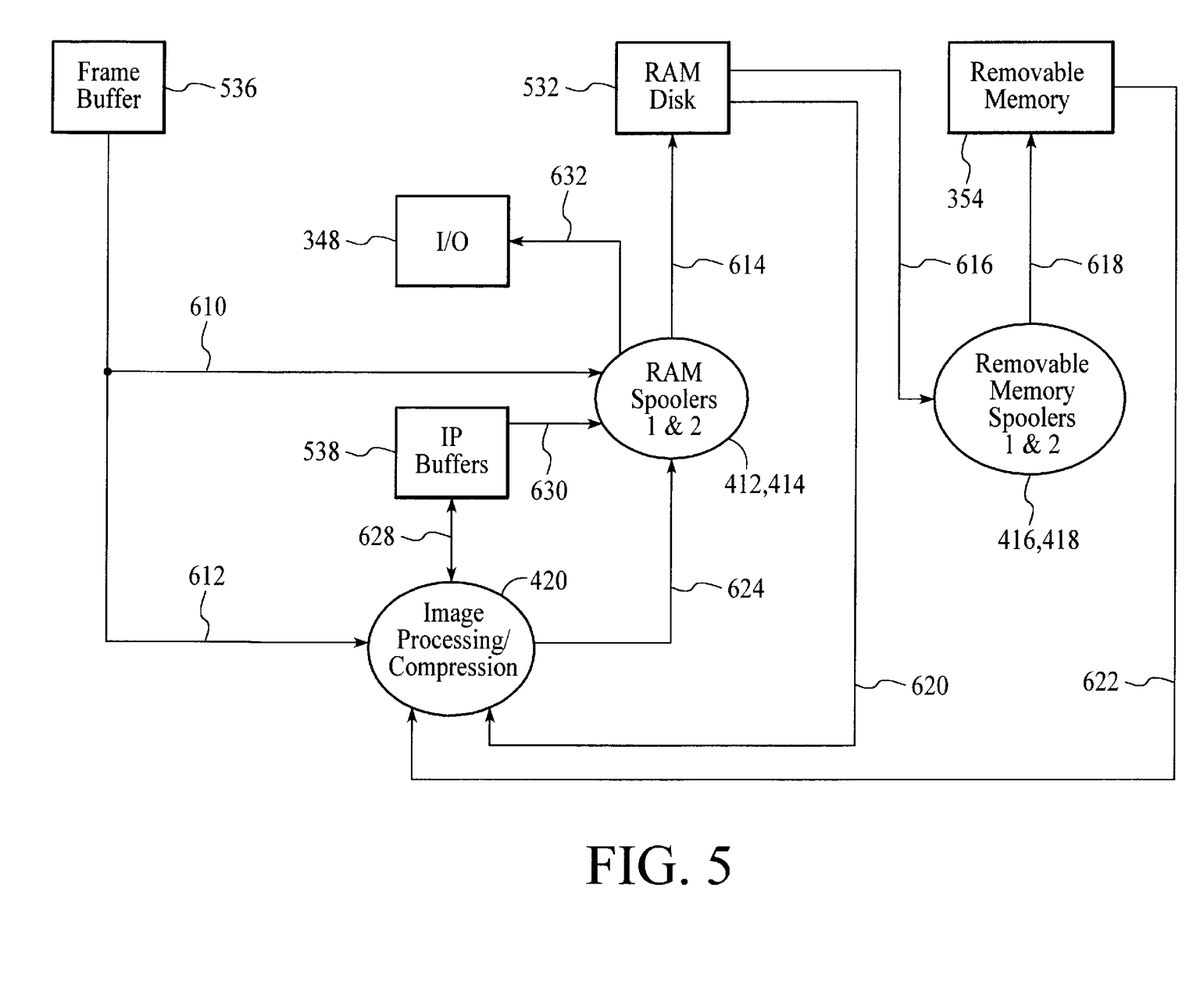
FIG. 5 is a block diagram showing preferred data paths for transmitting image data between components of the FIG. 3 computer.

Referring now to FIG. 5, a block diagram showing preferred data paths for transmitting image data between selected computer 118 components is shown. In FIG. 5, frame buffer 536 receives and stores raw image data previously captured by image device 114. Frame buffer 536 then transfers control of the raw image data to RAM spooler 1 (412) via line 610. Alternatively, if RAM disk 532 is full, frame buffer 536 may transfer control of the raw image data directly to image processing/compression 420 using line 612. If RAM spooler 1 (412) receives control of the raw image data, it then stores the raw image data into RAM disk 532 using line 614.

Removable memory spooler 1 (416) may then access the raw image data from RAM disk 532 via line 616 and store it into removable memory 354 using line 618. Alternatively, if removable memory 354 is full or is not inserted, RAM disk 532 may provide the raw image data directly to image processing/compression 420 using line 620. If removable memory spooler 1 (416) stores the raw image data into removable memory 354, then image processing/compression 420 typically accesses the stored raw image data using line 622.

Linking Image Processors for Forming Images

Figure 6:
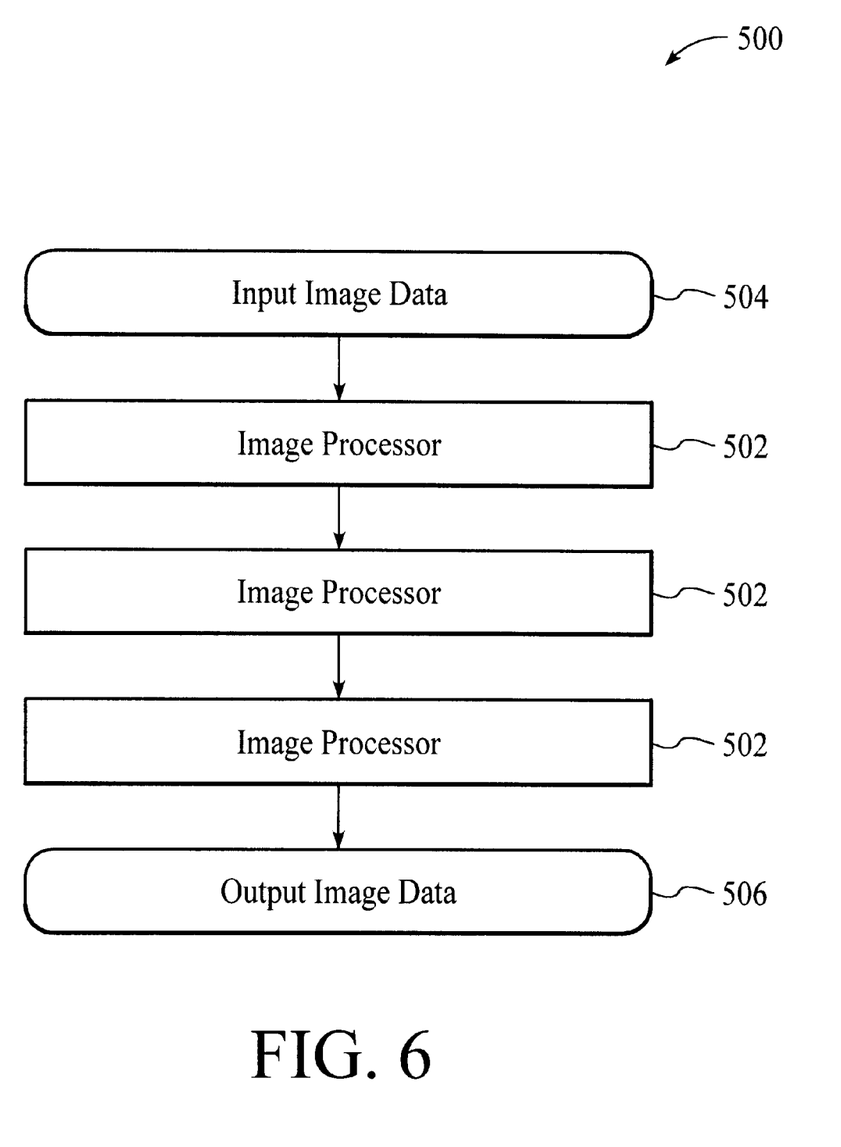
FIG. 6 illustrates an image processing chain of three image processors.

In the preferred embodiment, image processing and compression 420 occurs via an image processing chain (IPC). For purposes of this discussion, the IPC preferably refers to a software process that manipulates image data in a stage by stage fashion. As shown in FIG. 6, an IPC 500 is suitably composed of a sequence of image processors 502 with each image processor 502 performing a particular type of image transformation. The input image data 504 is suitably received from a single image source and output as output image data 506 into a single image destination. Image processors suitably refer to software modules that apply algorithms on image data to obtain a special image processing result, specific examples of which are described below with reference to FIG. 7.

Figure 7:
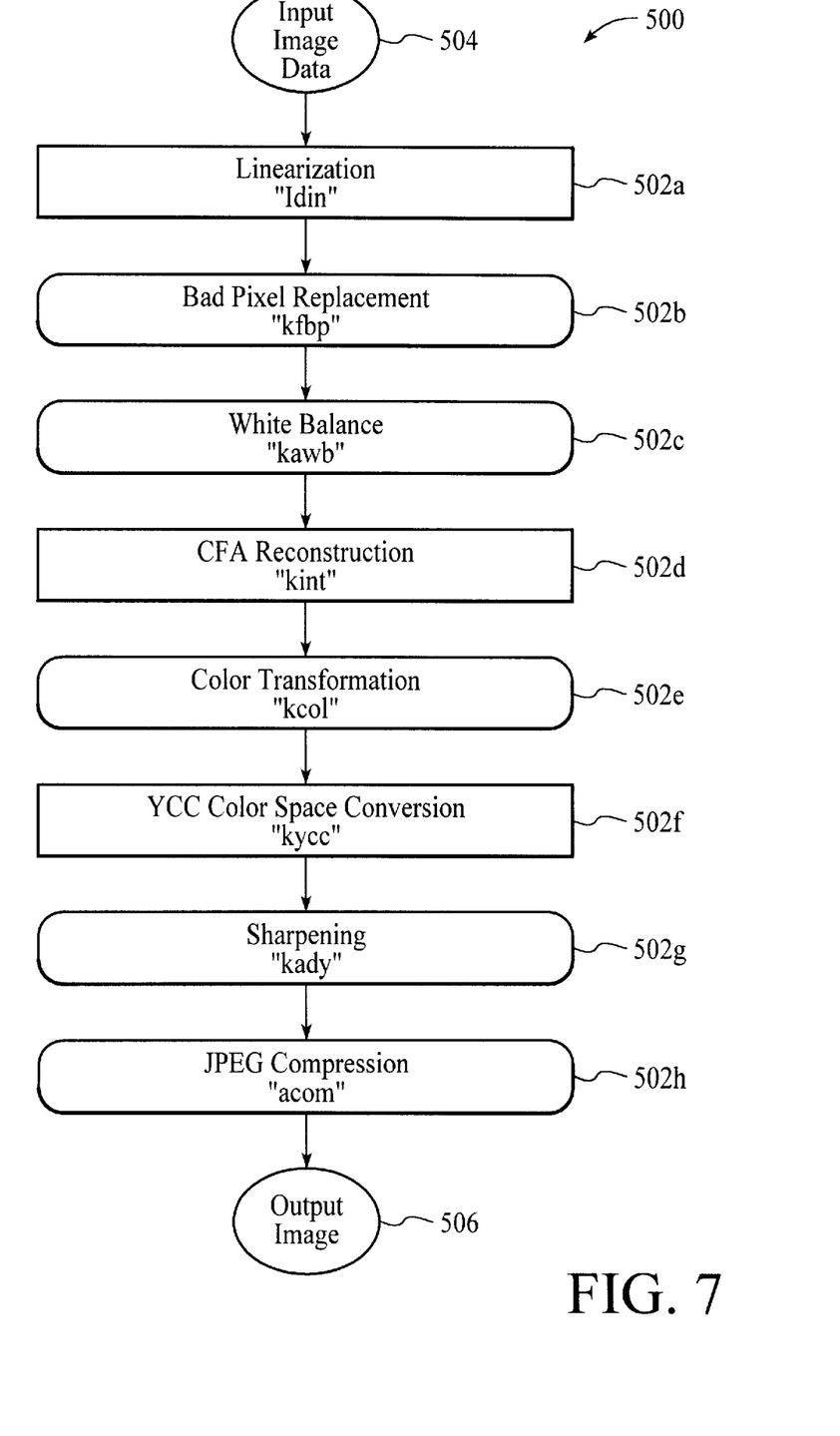
FIG. 7 illustrates a more specific example of the image processing chain.

FIG. 7 illustrates the IPC 500 with several examples of the image processors 502 capable for utilization as the IPC 500. For each of the image processors 502, an unambiguous image data format is specified for the input and output data. When the input and output image data formats are the same, the image processor 502 is considered non-transforming, examples of which are represented by the rounded boxes in FIG. 7. Conversely, image processors 502 that do not have the same input and output data formats are suitably considered transforming, e.g., the rectangles of FIG. 7. Although the following description of FIG. 7 is given with a particular order and series of image processors for image processing to occur in a sequential and serial manner, it should be appreciated that in the preferred embodiment, any number of non-transforming image processors may be chained between two separate transforming image processors. Further, brief descriptions of the type of image processing capable by each image processor 502 are included as examples. However, the details of such processing are not included in the present discussion and are considered to be well understood by those skilled in the art. Thus, image processing through the use of other image processors in the IPC 500 is within the spirit and scope of the present invention.

The image processors 502 suitably include a first image processor 502a for linearization of the input image data 504. By way of example, linearization refers to a straightforward conversion of the image data from an eight-bit non-linear space to sixteen-bit linear space. As a more specific example, input pixels stored as eight bit compressed Bayer pattern image data are converted through linearization image processor 502a into sixteen bit extended Bayer pattern image data.

A next suitable image processor 502b is a bad pixel replacement processor. Bad pixel replacement suitably occurs through interpolation of the neighborhood pixels around the defective CCD pixels. The processing by image processor 502b capably receives and outputs pixel data in sixteen-bit linear space Bayer format.

As a next image processor 502, white balance processor 502c performs white balance image processing. Pixel data received and output by the white balance image processor 502c are appropriately stored in sixteen-bit linear space Bayer format.

A fourth image processor 502d preferably performs image color or color filter array (CFA) reconstruction. By way of example, the CFA reconstruction image processor 502d suitably achieves an interpolation operation to convert sixteen-bit Bayer CFA pattern CCD data into a forty-eight bit extended RGB image.

Following CFA reconstruction image processor 502d, color transformation image processor 502e is included. An appropriate color transformation image processor 502e employs a color correction matrix, such as to convert from device-dependent camera color space to device-independent linear CCIR709 color space. Preferably, the input and output pixel data is stored in forty-eight bit extended RGB format.

As a next image processor, YCC color space transformation image processor 502f is included. The YCC color space conversion image processor 502f suitably uses CCIR 601-2 specification to create an eight-bit YCrCb image from an RGB image. Input pixel data to image processor 502f is suitably given in forty-eight bit extended RGB format with output pixel data in twenty-four bit YCrCb444 format.

Two additional image processors 502 in the IPC 500 include sharpening image processor 502g and JPEG compression image processor 502h. Sharpening image processor 502g suitably receives input pixel data in twenty-four bit YCrCb format and outputs pixel data in the same format after performing sharpening operations. Parameter control of the sharpening suitably occurs with a range of values for the sharpening operation.

The JPEG compression image processor 502h suitably performs JFIF base line image compression. Input pixel data in twenty-four bit YCrCb444 format is output from image processor 502h as compressed and subsampled YCC format, 48-bit YCrCb411 per 4-pixel data. Two forms of parameter controls are achieved via image processor 502h to both control the degree of compression, e.g., maximum to normal to lossless, and to identify data as color or grayscale.

Coordination of the image processors 502 to form the IPC 500 is preferably done via an image processing backplane (IPB). In a preferred embodiment, the image processing backplane provides processing support in a broad manner to allow varying algorithms to be incorporated as image processors 502. The features of the processing support by the IPB are described in more detail with reference to FIG. 8 and include performing image scan line buffer input/output (I/O), IPC construction and connection, image processor parameter control setting, single pass through image data, procedural interface to the image processors, circular data pipeline support, and ring-pixel handling, with minimal memory requirements and overheads.

Figure 8:
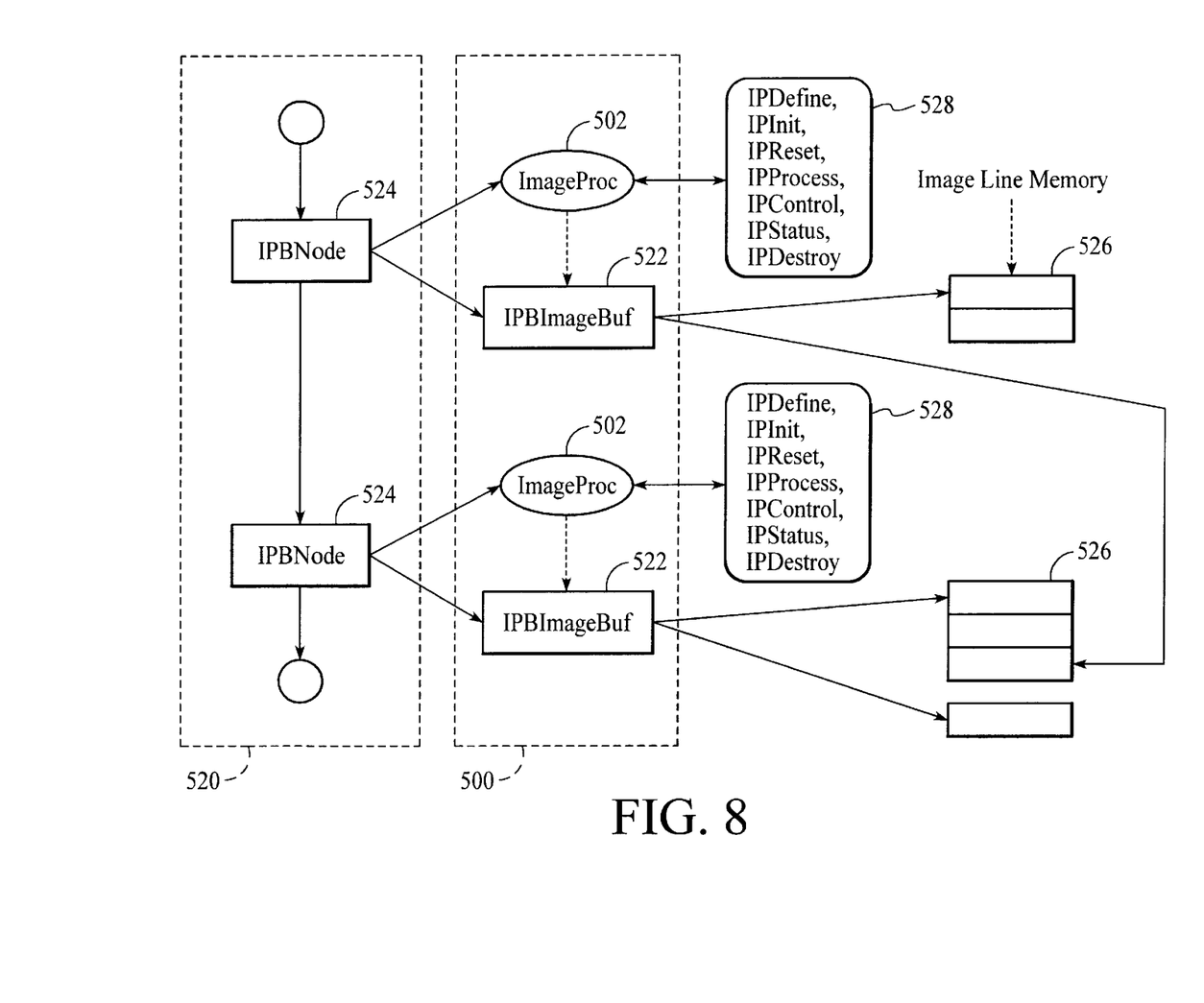
FIG. 8 illustrates an image processing backplane in conjunction with the image processing chain of FIG. 6.

FIG. 8 illustrates schematically an IPB 520 in conjunction with an IPC 500 including two image processors 502. Suitably, internal data structures, e.g., IPBImageBuf 522 and IPBNode 524, are maintained by the IPB 520 for storing information related to the image processors 502 during processing and are connected indirectly in terms of data flow, as indicated by the dashed arrows in FIG. 8. The information maintained by the data structures 522 and 524 preferably includes locations of the input and output line buffers, and internal state and functional routine entry pointers of each image processor 502. Thus, data structure 522 capably contains pointers pointing to image scan line buffers 526 that are used to store input and output image data in formats suitably determined during installation of an image processor 502. More particularly, the image scan line buffers 526 preferably store one or more image scan lines, i.e., the lines of data forming a data pipeline that consists of the minimum number of lines required by an image processor 502.

For image processors 502, processing suitably occurs with a data pipeline that contains a single image scan line, i.e., an image pixel line in the fast scan direction from left to right. However, some image processors 502, such as compression image processors (e.g., 502h, FIG. 7), utilize more than one scan line during processing to take neighboring effects into account. When more than one scan line is needed by an image processor 502, a data pipeline is suitably defined for convenience at the input end of the image processor 502. For purposes of this discussion, a data pipeline refers to a minimum collection of image scan lines required by an image processor 502. Generally, a data pipeline includes an image scan line currently being processed, and some number of image scan lines prior to ('lookback') and/or after ('lookahead') the current image scan line. Suitably, access to the data pipeline occurs via a circular array of buffer pointers, so that after each processing iteration of the image processor 502, the pointers in the array are circularly rotated, as is well understood by those skilled in the art. In contrast to prior devices that typically require large amounts of memory to perform image data manipulations, the image scan line buffers provide sufficient memory to perform processing one scan line at a time, thus reducing the overall memory requirements without reducing processing capabilities.

Preferably, the data pipeline required by an image processor 502 is indicated during the installation of the image processor 502 in the IPC 500. Installation of an image processor 502 suitably occurs when the camera first starts up with an IPC 500 constructed from all of the default image processors 502 stored in the system ROM. Suitable functions to coordinate the construction and destruction of the IPC 500 include four functions, an initialization function, e.g., IPCInit, an installation function, e.g., IPCInstallImageProcessor, a connection function, e.g., IPCConnect, and a destruction function, e.g., IPCDestroy.

The IPC initialization function is called to create a new IPC 500. A suitable default IPC 500 converts raw CCD capture data into a JPEG compressed image. Preferably, the IPC initialization function returns a reference to a new image processing chain, identifies types of image processors included in the chain, and specifies a maximum expected width in pixels to be sent through the IPC, where the maximum width includes ring-pixels, which refer to supplementary image data at each side of the image required by an image processor to perform a particular algorithm.

The IPC installation function is called by an image processing application to the IPB 520 to install the image processor 502 into the IPC 500. Preferably, the installation function specifies an IPC reference number, as identified in the initialization function, and provides pointers to the seven functional routine entries, as discussed hereinbelow, of the image processor being installed.

The IPC connection function specifies an IPC reference number, and signals to the IPB 520 that all image processors 502 have been installed and that the IPC 500 contains all the required image processors 502 to perform image processing. The IPC destruction function specifies an IPC reference number and is called to destroy an IPC 500. Although a default camera IPC 500 is unlikely to be destroyed, other IPCs added to a camera for other purposes, by functions in accordance with a preferred embodiment and discussed in more detail hereinbelow, are suitably destroyed with this function.

Modularity of Image Processors Through Flexible Updating of an IPC

Alterations to an existing IPC 500 readily occurs in a preferred embodiment through an update function, e.g., IPBUpdateDefaultIPC, that specifies the IPC reference number for the IPC 500 being updated/modified. Updating of an IPC 500 includes insertion of an image processor 502 to the IPC 500, deletion of an image processor 502 from the IPC 500, or replacement of an image processor 502 with an alternate image processor 502. Preferably, the default IPC 500 is updated via an image processor module on a storage device, e.g., removable memory, RAM disk, or internal memory. The image processor module suitably contains one or more plug-in image processors that each have one additional function, e.g., IPMPlugInProc, that defines the updating strategy, the signature of the target image processor to be updated, and pointers of the seven basic functions of an image processor, as described hereinbelow. Lack of identification of valid target image processors in an IPC or lack of match between the format of the output of one image processor and input of a next image processor chained together preferably results in cancellation of the updating attempt and restoration of the default IPC 500.

Defining an image processor 502, for use in a default IPC 500 or as an updating image processor, suitably occurs through seven functional routines or procedures, as indicated by block 528 in FIG. 8. A definition function, e.g., IPDefineProc, allows an image processor 502 to specify its characteristics. It is appropriately called by the IPB 520 when the image processor 502 is installed into the IPC 500 to identify the characteristics of the image processor 502. By way of example, for an image processor 502 that performs color correction via a 3×3 matrix, input and output formats of 48 bit extended RGB are capably identified by the definition function. Further characteristics identified include the configuration of the data pipeline associated with the image processor 502, the number of ring-pixels, and the number of parameter controls.

An initialization function, e.g., IPInitProc, appropriately allows an image processor 502 to allocate any internal storage it might need when processing an image. It is suitably called by the IPB 520 only once when the image processor 502 is installed into the IPC 500. Subsequent calls to the other five functions described below then pass the internal storage space allocated by the IPInitProc as an argument. Further identified by the initialization function is the maximum width specification of an image scan line in pixels that is expected at the input, including ring-pixels at both the left and right sides. In the example of defining the color correction image processor, the initialization function capably identifies a memory location storing a pointer to needed 3×3 matrix constant value internal variables, and the maximum width.

Two functions, a control function, e.g., IPControlProc, and a status function, e.g., IPStatusProc, deal with parameter controls of an image processor 502. Preferably, parameter controls for an image processor 502 each have a unique 4-character tag that is registered to avoid conflict. Parameter control values include two types, a range type and an enumerated list type. Range types of parameter control values are appropriately confined between the minimum and maximum settings for the range. Enumerated list parameter control values assign different enumerated numbers to different settings with a 32-character null terminated string used to provide an ASCII name for each enumerated list number. Examples of parameter controls include sharpening values (range type), color specification control values (range type), and compression control values (enumerated list type).

The control function, IPControlProc, is called by the IPB 520 to control the processing parameters one parameter control at a time and only before a reset function, e.g., IPReset, call for every image to be processed. The status function, IPStatusProc, allows an image processor 502 called by the IPB 520 to determine any parameter kind, values types, factory default parameter setting, and current parameter setting of an image processor 502. No-operation routines are provided when the image processor does not support any parameter settings, such as in the example of the color correction image processor.

The reset function, IPResetProc, suitably allows IPB 520 to signal an image processor 502 to reset any internal variables used by the image processor 502 before every image is processed. With the color correction image processor example, no operation routines are provided, since no local variables need to be reset. A process function, e.g., IPProcessProc, suitably allows an image processor 502 to process image data one scan line at a time. It is suitably called whenever a data pipeline for the image processor 502 fills up. Thus, the operations for performing the 3×3 matrix manipulation in the color correction image processor example, are specified with the process function. A destruction function, e.g., IPDestroyProc, suitably allows an image processor to deallocate any internal storage allocated at initialization. It is appropriately called when the IPC 500 containing the image processor 502 is being removed. In response to this call, the image processor 502 preferably deallocates internal storage allocated in the initialization function call.

Entry points to these seven functional routines for an image processor 502, stored in an external data structure, e.g., Functions, as well as the characteristics of the image processor 502, are suitably stored in an internal data structure, e.g., ImageProc, by the IPB 520. Once the image processors 502 are defined through the seven functional routines and connected in an IPC 500, the IPB 520 suitably facilitates image processing operations by managing image buffer I/O, and activation of each image processor 502 as soon as enough input data has been collected. The information for the image data processed is suitably stored in a data structure, e.g., ImageInfo, including raw image size captured by a camera CCD, final processed output image size, bad pixel locations, etc.

Modifiable Parameter Control of Image Processor in an IPC

In a preferred embodiment, the IPB 520 further provides routines to allow exchanges of parameter control settings by an external mechanism, such as a control application 400 (FIG. 4). These functions include parameter control capability and value determination functions, e.g., IPBGetParameterCapability, IPBGetDefaultParameter, and IPBGetParameter. Also included are functions for setting or restoring parameter control values, e.g., IPBSetDefaultParameter, IPBSetParameter, and IPBRestoreParameter. Preferably, for the parameter control value determination functions, an IPC 500 and the number of parameters requested are identified, as well as identification of a pointer to an array of parameter tags, a pointer to a memory location used to store a pointer for the parameter settings returned, and a pointer to a memory location where the number of bytes of parameter control values are stored. Similarly, for the capability determination function, an IPC is specified, the number of parameters requested is specified, a pointer to an array of parameter tags is specified, a pointer to a memory location used to store a pointer for the parameter capability information returned is specified, and a pointer to a memory location where the number of bytes of parameter capability information is stored is specified. Thus, access to the parameter controls managed by an IPC 500 are available, as well as current values, device dependent factory default values, and user-specified default values.

For the parameter control value setting functions, preferably identified by the functions are an IPC, a number of parameter control values to be set, and a pointer to a list of parameter tags and either a current value or a user default value that are to be set by the function. In addition, the set parameter function appropriately allows all parameters not listed in the specified parameter value list to be reset to their user default value when a Boolean variable is set. The restoration function similarly identifies an IPC and a number of parameters to be requested, provides a pointer to an array of parameter tags, and selects the type of parameter defaults, i.e., user-specified or device dependent factory, being reset through a Boolean variable. These functions therefore provide convenient accessibility to allow alteration of parameter control values in an IPC 500. Greater flexibility for adjusting an image processor 502 within an IPC 500 is advantageously provided.

Although the present invention has been described in accordance with the embodiments shown, one of ordinary skill in the art will recognize that there could be variations to the embodiment and those variations would be within the spirit and scope of the present invention. Accordingly, many modifications may be made by one of ordinary skill without departing from the spirit and scope of the present invention, the scope of which is defined by the following claims.

What is claimed is:

1. A method for manipulating image data in a digital image capture device, the method comprising:

forming two or more image processors;

providing the two or more image processors in the digital image capture device; and linking the two or more image processors to form an image processing chain (IPC), the IPC capable of manipulating image data in sequential and serial manners, the image processors in the IPC coordinated by an image processing backplane (IPB), wherein the IPB comprises:

at least one data structure for storing information relating to the image processors of the IPC, and a plurality of functions for initializing the IPC, installing an image processor into the IPC, signaling that all image processors are installed into the IPC, destroying the IPC, and updating the IPC, wherein the IPB is capable of calling functions for defining, initializing, resetting, processing, controlling, obtaining a status of, and destroying an image processor.

2. The method of claim 1 wherein one of the IPC image processors comprises a linearization image processor.

3. The method of claim 1 wherein one of the IPC image processors comprises a bad pixel replacement image processor.

4. The method of claim 1 wherein one of the IPC image processors comprises a white balance image processor.

5. The method of claim 1 wherein one of the IPC image processors comprises an image reconstruction image processor.

6. The method of claim 1 wherein one of the IPC image processors comprises a color correction image processor.

7. The method of claim 1 wherein one of the IPC image processors comprises a color space conversion image processor.

8. The method of claim 1 wherein one of the IPC image processors comprises a sharpening image processor.

9. The method of claim 1 wherein one of the IPC image processors comprises a compression image processor.

10. A system for manipulating digital image data, the system comprising:

a digital image capture device, the digital image capture device capable of processing digital image data through two or more image processors; and a central processing unit within the digital image capture device and capable of linking the two or more image processors to form an image processing chain (IPC), wherein the IPC manipulates the digital image data in sequential and serial manners, wherein the image processors in the IPC are coordinated by an image processing backplane (IPB), wherein the IPB comprises:
at least one data structure for storing information relating to the image processors of the IPC, and
a plurality of functions for initializing the IPC, installing an image processor into the IPC, signaling that all image processors are installed into the IPC, destroying the IPC, and updating the IPC,
wherein the IPB is capable of calling functions for defining, initializing, resetting, processing, controlling, obtaining a status of, and destroying an image processor.

11. The system of claim 10 wherein one of the IPC image processors comprises a linearization image processor.

12. The system of claim 10 wherein one of the IPC image processors comprises a bad pixel replacement image processor.

13. The system of claim 10 wherein one of the IPC image processors comprises a white balance image processor.

14. The system of claim 10 wherein one of the IPC image processors comprises an image reconstruction image processor.

15. The system of claim 10 wherein one of the IPC image processors comprises a color correction image processor.

16. The system of claim 10 wherein one of the IPC image processors comprises a color space conversion image processor.

17. The system of claim 10 wherein one of the IPC image processors comprises a sharpening image processor.

18. The system of claim 10 wherein one of the IPC image processors comprises a compression image processor.

19. A computer readable medium containing program instructions for:

forming two or more image processors;

providing the two or more image processors in the digital image capture device; and linking the two or more image processors to form an image processing chain, the image processing chain capable of manipulating image data in sequential and serial manners, the image processors in the IPC coordinated by an image processing backplane (IPB), wherein the IPB comprises:
at least one data structure for storing information relating to the image processors of the IPC, and
a plurality of functions for initializing the IPC, installing an image processor into the IPC, signaling that all image processors are installed into the IPC, destroying the IPC, and updating the IPC,
wherein the IPB is capable of calling functions for defining, initializing, resetting, processing, controlling, obtaining a status of, and destroying an image processor.

* * * * *